US010116726B2

(12) United States Patent
Scoda

(10) Patent No.: US 10,116,726 B2
(45) Date of Patent: Oct. 30, 2018

(54) METHODS FOR BUNDLING IMAGES AND DEVICES THEREOF

(71) Applicant: Usablenet Inc., New York, NY (US)

(72) Inventor: Enrico Scoda, Martignacco (IT)

(73) Assignee: USABLENET INC., New York, NY (US)

(*) Notice: Subject to any disclaimer, the term of this patent is extended or adjusted under 35 U.S.C. 154(b) by 71 days.

(21) Appl. No.: 13/937,596

(22) Filed: Jul. 9, 2013

(65) Prior Publication Data
US 2015/0019688 A1 Jan. 15, 2015

(51) Int. Cl.
H04L 29/08 (2006.01)
G06F 17/30 (2006.01)

(52) U.S. Cl.
CPC ........ *H04L 67/02* (2013.01); *G06F 17/30902* (2013.01)

(58) Field of Classification Search
CPC ...................................... H04L 67/02
USPC ........................................... 709/219
See application file for complete search history.

(56) References Cited

U.S. PATENT DOCUMENTS 7,917,853 B2 *  3/2011  Trauth ......................... 715/733
2002/0010798 A1 *  1/2002  Ben-Shaul .......... G06F 17/3089
                                                709/247
2005/0080871 A1 *  4/2005  Dinh et al. .................... 709/217
2010/0235473 A1 *  9/2010  Koren et al. .................. 709/219

OTHER PUBLICATIONS

Communication pursuant to Article 94(3) EPC for corresponding European Patent Application No. 14176090.0 (dated Feb. 23, 2017).
European Search Report for European Patent Application No. 14176090.0, (dated Dec. 22, 2014).
Walsh, D., "JavaScript Canvas Image Conversion", retrieved from URL:http://davidwalsh.name/convert-canvas-image on Nov. 24, 2014, pp. 1-6 (May 8, 2012).

* cited by examiner

*Primary Examiner* — Normin Abedin
*Assistant Examiner* — Sibte Bukhari
(74) *Attorney, Agent, or Firm* — LeClairRyan PLLC

(57) ABSTRACT

A method, non-transitory computer readable medium, and web server device that obtains a web page comprising a plurality of image elements each including a source attribute having a value identifying an image. Each of the image elements is modified to insert a data attribute having a value of the respective source attribute value and to replace the source attribute value with a data URI. A reference to a executable file is inserted into the web page. The web page is sent to the client device and a request from the client device for the executable file is received. The executable file is sent to the client device and is configured when executed to replace the source attribute value of each of the image elements with a data URI of an image identified by the respective data attribute value.

18 Claims, 3 Drawing Sheets

```
<body>                             300                          302
    <div id="nav">
        <img src="icons/fb.png" alt="Facebook share" onclick="fb_share()"/>
        <img src="icons/twitter.png" alt="Twitter share" onclick="twitter_share()"/>
    </div>                                                      304
    <div id="content">
        <img src="http://www.acme.com" alt="Acme logo"/>
    </div>                                          306
</body>
```

FIG. 3

```
<body>                          400                             402
    <div id="nav">
        <img src="data:image/gif;base64,R0lGODlhAQABAIAAAP///wAAACH5BAkUAAEALAAAAAABAAEAAAICTAEAOw=="
             data-bundle="icons/fb.png" alt="Facebook share" onclick="fb_share()"/>
        <img src="data:image/gif;base64,R0lGODlhAQABAIAAAP///wAAACH5BAkUAAEALAAAAAABAAEAAAICTAEAOw=="
             data-bundle="icons/twitter.png" alt="Twitter share" onclick="twitter_share()"/>
    </div>
    <div id="content">                              404
        <img src="http://www.acme.com" alt="Acme logo"/>
    </div>
    <div>
        <script type="text/javascript" src="icons/v1.js"></script>
    </div>                                              406
</body>
```

FIG. 4

```
                                                        502
function unBundleTag(tag) {
    var a = {"icons/fb.png":'data:image/png;base64,iVBORw0KGgoAAAANSUhEUgAAA...',
             "icons/twitter.png":'data:image/png;base64,iVBORw0KGgoAAAANSUhEUgAAA...'}
    var elts=document.getElementsByTagName(tag);               504
    for (var i=0; i<elts.length; i++) {
        var src=a[elts[i].getAttribute('data-bundle')];
        if (src){
            elts[i].removeAttribute('data-bundle');
            elts[i].src = src;
        }
    }
}
function unBundle() {
    unBundleTag('img');
    unBundleTag('input');
};                                                          500
unBundle();
```

FIG. 5

METHODS FOR BUNDLING IMAGES AND DEVICES THEREOF

FIELD

This technology generally relates to methods and devices for optimizing transmission of web page images and, more particularly, methods for bundling images and devices thereof.

BACKGROUND

Many web sites are increasingly sophisticated and provide rich multimedia experiences for users. Often, the multimedia content of a web page includes a significant number of images which are sent across a communication network. For example, product catalog and social network web pages are generally image-intensive, although many other types of web pages also have significant graphical content. The images of a web page are generally each retrieved through a hypertext transfer protocol (HTTP) request sent from a client device while rendering the web page. However, many networks have high latency and require a significant amount of time to transmit each request and server response including one of the requested images. Latency is a particularly significant issue with respect to networks generally utilized by mobile devices.

In order to reduce the number of HTTP requests sent by a client device for the images of a web page, web servers can parse web pages requested by client devices to identify referenced images, retrieve the images, generate an encoding of each of the images, and modify the web pages to include the encoding of the images in-line prior to sending the web pages to the requesting client devices. The embedded encoding can be a base 64 representation of each image and can be included in the web page according to a data uniform resource identifier (URI) scheme, for example. By including the referenced images in-line, web pages can be rendered by web browsers of client devices without requiring an HTTP request and response for each of the images.

While including images in-line can reduce the time required to render a web page, particularly in high latency communication networks, there are several drawbacks to this approach. For example, the images are not cached separately from the web page that includes the corresponding in-line encoding. Accordingly, every time a change is made to the web page, and a cached version of the web page becomes invalid, the images must again be encoded and embedded in-line. Another drawback is that multiple copies of the encoded version of images that are referenced more than once in a web page are generated, while externally-referenced images are downloaded only once irrespective of the number of references to the images in the web page.

SUMMARY

A method for bundling images includes obtaining, with a web server, a web page requested by a client device, the web page comprising a plurality of image elements each including a source attribute having a value identifying an image. Each of the plurality of image elements is modified, with the web server, to insert a data attribute having a value of the respective source attribute value and to replace the source attribute value with a data uniform resource indicator (URI). With the web server, a reference to an executable file is inserted into the requested web page, the requested web page is sent to the client device, and then a request from the client device for the executable file is received. The executable file is sent with the web server to the client device in response to the request and is configured when executed to replace the source attribute value of each of the plurality of image elements with a data URI of an image identified by the respective data attribute value.

A non-transitory computer readable medium having stored thereon instructions for bundling images comprising machine executable code which when executed by a processor, causes the processor to perform steps including obtaining a web page requested by a client device, the web page comprising a plurality of image elements each including a source attribute having a value identifying an image. Each of the plurality of image elements is modified to insert a data attribute having a value of the respective source attribute value and to replace the source attribute value with a data URI. A reference to a executable file is inserted into the web page, the web page is sent to the client device, and a request from the client device for the executable file is received. The executable file is sent to the client device in response to the request and is configured when executed to replace the source attribute value of each of the plurality of image elements with a data URI of an image identified by the respective data attribute value.

A web server device includes a processor coupled to a memory and configured to execute programmed instructions stored in the memory including obtaining a web page requested by a client device, the web page comprising a plurality of image elements each including a source attribute having a value identifying an image. Each of the plurality of image elements is modified to insert a data attribute having a value of the respective source attribute value and to replace the source attribute value with a data URI. A reference to a executable file is inserted into the web page, the web page is sent to the client device, and a request from the client device for the executable file is received. The executable file is sent to the client device in response to the request and is configured when executed to replace the source attribute value of each of the plurality of image elements with a data URI of an image identified by the respective data attribute value.

This technology provides a number of advantages including methods, non-transitory computer readable medium, and a web server device that mitigates the negative affects of high network latency with respect to retrieval of web page images, while also reducing storage overhead. With this technology, web page images are encoded, bundled, and included in-line in web pages by a retrieved executable file. Advantageously, only one copy of each of the image encodings is stored irrespective of the number of references to the images in the web page. Additionally, the image encodings are stored separately from the associated web pages. Therefore, changes made to a web page that render a cached version invalid do not necessitate a subsequent downloading and encoding of the images of the web page.

BRIEF DESCRIPTION OF THE DRAWINGS

FIG. 3 is exemplary hypertext markup language (HTML) code fragment defining a portion of a web page that references multiple images;

FIG. 4 is an exemplary version of the HTML code fragment of FIG. 3 with image elements modified to include a data uniform resource identifier (URI) of a default image and a respective data attribute; and FIG. 5 is exemplary JavaScript code fragment configured to insert, when executed by a client device, a data URI of the images referenced by the HTML code fragment of FIG. 3.

DETAILED DESCRIPTION

Figure 1:
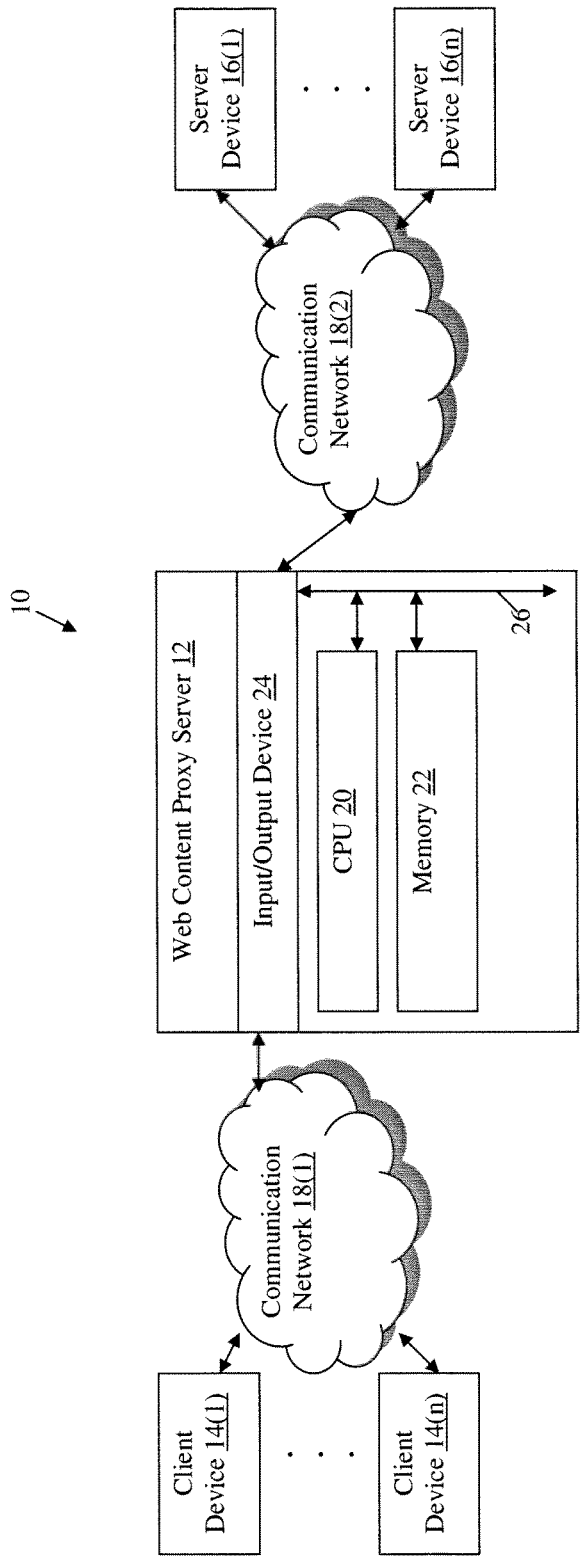
FIG. 1 is a block diagram of an environment with an exemplary web content proxy server.

An exemplary environment 10 with a web content proxy server 12 coupled to client devices 14(1)-14(n) and server devices 16(1)-16(n) by communication networks 18(1)-18(2) is illustrated in FIG. 1. Other numbers and types of systems, devices, and/or elements in other configurations and environments with other communication network topologies can also be used. This technology provides a number of advantages including providing methods, non-transitory computer readable medium, and devices for bundling and in-lining web page images to reduce the number of communications required to render the images on a client device while also reducing storage overhead.

Referring more specifically to FIG. 1, the web content proxy server 12 includes a central processing unit (CPU) 20 or processor, a memory 22, and an input/output device 24, which are coupled together by a bus 26 or other link, although other numbers and types of components, parts, devices, systems, and elements in other configurations and locations can be used. The CPU 20 in the web content proxy server 12 executes a program of stored instructions one or more aspects of the present invention as described and illustrated by way of the embodiments herein, although the CPU 20 could execute other numbers and types of programmed instructions.

The memory 22 in the web content proxy server 16 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the CPU 20, can be used for the memory 22 in the web content proxy server 12.

The input/output device 24 in the web content proxy server 12 is used to operatively couple and communicate between the web content proxy server 12, client devices 14(1)-14(n), and server devices 16(1)-16(n) via the communication networks 18(1)-18(2). One or more of the communication networks 18(1)-18(2) can include one or more networks, such as one or more local area networks (LANs) and/or wide area networks (WANs). By way of example only, the communication networks can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used.

The client devices 14(1)-12(n) enable a user to request, receive, and interact with applications, web services, and content hosted by the server devices 16(1)-16(n) through the web content proxy server 12 via the communication network 18(1), although one or more of the client devices 14(1)-14(n) could access content and utilize other types and numbers of applications from other sources and could provide a wide variety of other functions for the user. In some examples, the client devices 14(1)-14(n) comprise mobile computing devices with Internet access that enable web pages and other content stored by the server devices 16(1)-16(n) to be retrieved and rendered. By way of example only, the client devices 14(1)-14(n) can be smart phones, personal digital assistants, or computers.

Each of the client devices 14(1)-14(n) includes a CPU, a memory, an input device, a display device, and an input/output device, which are coupled together by a bus or other link, although one or more of client devices 14(1)-14(n) can include other numbers and types of components, parts, devices, systems, and elements in other configurations. The CPU in the client devices 14(1)-14(n) can execute a program of instructions stored in the memory of the client device 14(1)-14(n) for one or more aspects of the present invention as described and illustrated herein, although the CPU could execute other numbers and types of programmed instructions.

The input device in each of the client devices 14(1)-14(n) can be used to input selections, such as a request for a particular web page, although the input device could be used to input other types of requests and data and interact with other elements. The input device can include keypads, touch screens, and/or vocal input processing systems, although other types and numbers of input devices can be used.

The display device in each of the client devices 14(1)-14(n) can be used to show data and information to the user, such as web pages retrieved from the server devices 16(1)-16(n) by way of example only. The display device in each of the client devices 14(1)-14(n) can be a mobile phone screen display, although other types and numbers of displays could be used depending on the particular type of client device.

The input/output device in each of the client devices 14(1)-14(n) can be used to operatively couple and communicate between the client devices 14(1)-14(n), the web content proxy server 12, and the server devices 16(1)-16(n) over the communication networks 18(1)-18(2).

Each of the server devices 16(1)-16(n) provides content including web pages for use by one or more of the client devices 14(1)-14(n) via the web content proxy server 12, although the server devices 16(1)-16(n) can provide other numbers and types of content and perform other functions. Each of the server devices 16(1)-16(n) can include a CPU, a memory, and an input/output device, which are coupled together by a bus or other link, although each of the server devices 16(1)-16(n) could have other numbers and types of components, parts, devices, systems, and elements in other configurations and locations.

The CPU in each of the server devices 16(1)-16(n) executes a program of instructions stored in the memory of the server devices 16(1)-16(n) for one or more aspects of the present invention, as described and illustrated by way of the embodiments herein, although the CPU could execute other numbers and types of programmed instructions.

The input/output device in each of the server devices 16(1)-16(n) is used to operatively couple and communicate between the server devices 16(1)-16(n), the web content proxy server 12, and the client devices 14(1)-14(n) via the communication networks 18(1)-18(2).

Although embodiments web content proxy server 12, the client devices 14(1)-14(n), and the server devices 16(1)-16(n) are described and illustrated herein, each of the web content proxy server 12, the client devices 14(1)-14(n), and the server devices 16(1)-16(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a CPU, cause the CPU to carry out the steps necessary to implement the methods of the embodiments, as described and illustrated herein.

Figure 2:
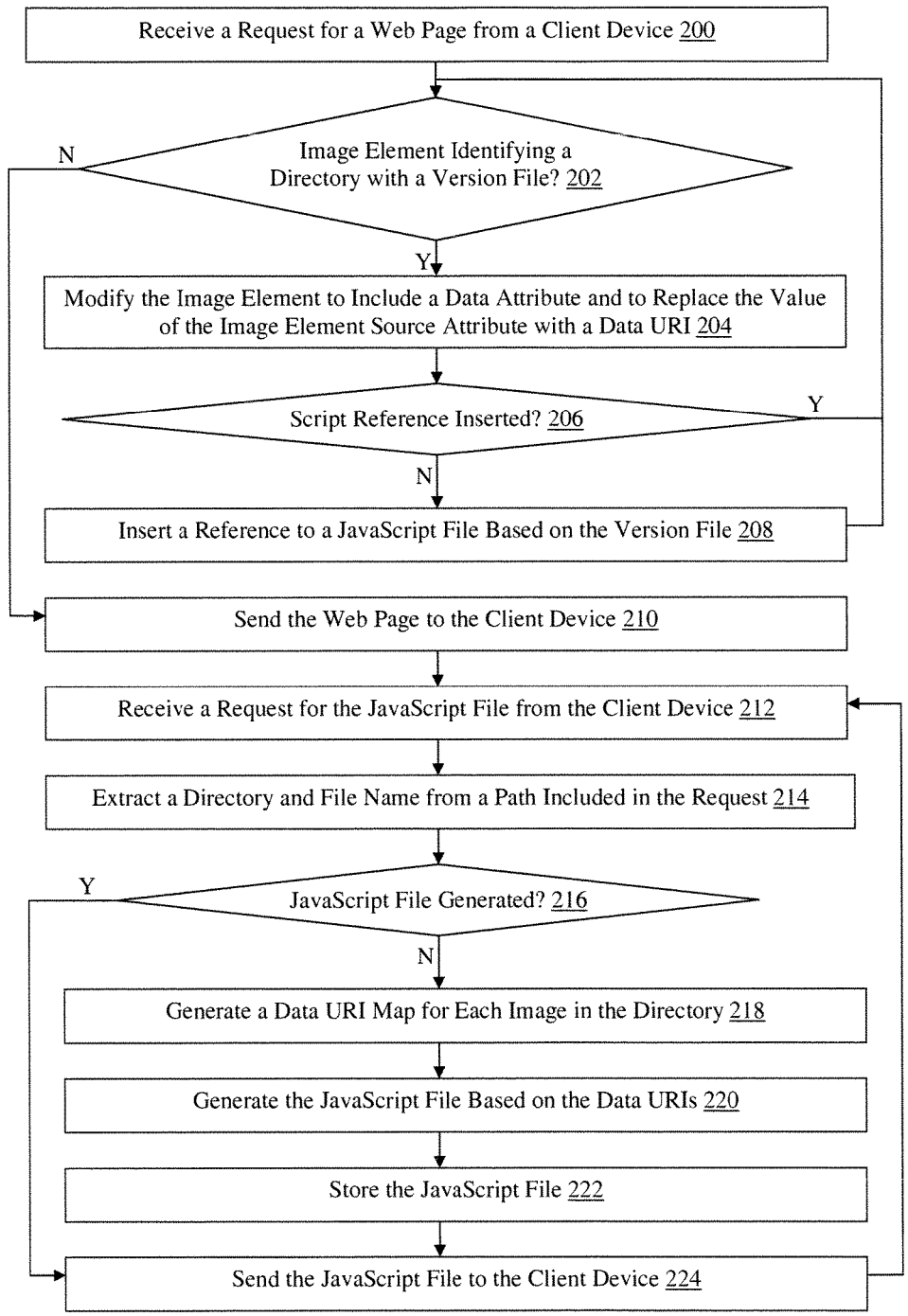
FIG. 2 is a flow chart of an exemplary method for bundling web page images.

An exemplary method for bundling images will now be described with reference to FIGS. 1-5. In this example, in step 200, the web content proxy server 12 receives a request for a web page from one of the client devices 14(1)-14(n). While in this example, steps 200-224 illustrated in FIG. 2 are performed by the web content proxy server 12, one or more of steps 200-224 could be performed by one of the server devices 16(1)-16(n) or any other web server in communication with the one of the client devices 14(1)-14(n) through one or more of the communication networks 18(1) and 18(2). Accordingly, in this example, the request can be a hypertext transfer protocol (HTTP) request for a web page stored by one of the server devices 16(1)-16(n).

Upon receipt of the request from one of the client devices 14(1)-14(n), the web content proxy server 12 obtains the requested web page. In this example, the web content proxy server 12 obtains the requested web page by retrieving the requested web page from the one of the server devices 16(1)-16(n) on behalf of the requesting one of the client devices 14(1)-14(n). In other examples, the requested web page can be obtained by retrieving the requested web page from local memory, such as the memory 22, or by generating the requested web page, for example.

In this example, the requested web page is a hypertext markup language (HTML) document, a fragment 300 of which is illustrated in FIG. 3. The fragment 300 of the HTML document references multiple images including "fb.png" and "twitter.png". The "fb.png" and "twitter.png" images are stored in the "icons" directory, as indicated in the source attribute values of the image elements 302 and 304.

In step 202, the web content proxy server 12 determines whether there is an image element with a source attribute value identifying a directory with a version file. In the fragment 300, the directory identified by the source attribute value of each of the image elements 302 and 304 is the "icons" directory. Accordingly, the web content proxy server 12 determines whether the icons directory in this example includes a version file, which can be a text file with a default file name, for example, although other file formats can also be used. The version file is created and stored in the icons directory by a developer of the web page and is used to indicate that any images in the icons directory should be bundled when provided to a client device. The version file can also be used for other functions, as described and illustrated later.

In some examples, not all image elements of the requested web page are bundled and have a source attribute value identifying a directory with a version file. For example, directories in which only one image is stored will require the same number of communications to retrieve the image as required to retrieve an image bundle, as described and illustrated in more detail later. In other examples, image elements may reference images that are not bundled for any number of other reasons according to developer preference and, in yet other examples, all images of a web page can be bundled.

Accordingly, if the web content proxy server 12 determines in step 202 that there is an image element with a source attribute value identifying a directory with a version file, then the Yes branch is taken to step 204. In step 204, the web content proxy server modifies the image element to include a data attribute and to replace the source attribute value with a data uniform resource identifier (URI).

In this example, the inserted data attribute has a value that is equivalent to the source attribute value of the image element. Referring to FIG. 4, an exemplary fragment 400 is illustrated. In the fragment 400, the image element 302 is modified to include a data attribute "data-bundle='icons/fb.png'", among other modifications described and illustrated later, resulting in image element 402. Accordingly, image element 402 includes a data attribute having a value equivalent to the source attribute value "icons/fb.png" of the image element 302. Other methods of preserving the source attribute value of the image element can also be used.

Additionally, in step 204, the web content proxy server 12 replaces the source attribute value of the image element with a data URI. The data URI is an encoded version of an image that will be rendered in place of the image identified by the source attribute value of the image element 302. The data URI can be a base 64 encoding, although any other encoding can also be used. The data URI is effectively a placeholder, as described and illustrated in more detail later.

In this example, the source attribute value of the image element 302 is replaced with a data URI of a spacer graphic interchange format (GIF) transparent image in the element 402, although a data URI of any other default image can also be used. By using a spacer GIF image that is transparent, the user of the requesting one of the client devices 14(1)-14(n) will not see the image when the web page is rendered. Additionally, the overhead of including the data URI of the spacer GIF image is minimal.

In step 206, the web content proxy server 12 determines whether a script reference associated with the directory identified by the value of the data attribute included in the image element in step 204 has been previously inserted into the web page. A script reference will not have been previously inserted for each directory first encountered by the web content proxy server 12 in a source attribute value of an image element.

In this example, the directory identified by the data attribute of element 402, as inserted into the image element 302, is the "icons" directory. Since the "icons" directory is encountered for the first time in a first iteration in this example, the script reference will not have been previously included. If the web content proxy server 12 determines that a script reference associated with the directory identified by the value of the data attribute included in the image element in step 204 has not been previously included, then the No branch is taken to step 208.

In step 208, the web content proxy server 12 inserts a reference to a JavaScript file based on the version file included in the directory identified by the data attribute value of the image element 402. The reference to the JavaScript file can be a script element having a source attribute with a value identifying the JavaScript file or a jQuery function call, for example, although other script references can also be used. The version file includes content which is used as a portion of the file name included in the script reference. The content of the version file is inserted by a developer of the web page when the version file is stored in the directory, and is used to indicate whether a new JavaScript image bundle code should be generated, as described and illustrated in more detail later.

In this example, the fragment 400 includes a script reference as script element 406 having a source attribute value of "icons/v1.js". Accordingly, the icons directory includes a version file having content "v1" which, along with the JavaScript file extension ".js" is used to form the "v1.js" name of the JavaScript file in the source attribute value of the script element 406. Other content of the version file and other methods of naming the JavaScript file can also be used.

Upon inserting the reference to the JavaScript file in step 208, the web content proxy server 12 proceeds to step 202. In step 202, the web content proxy server 12 determines whether there is another image element with a source attribute value identifying a directory with a version file, as described and illustrated earlier. In this example, the next image element 304 of the fragment 300 also has a source attribute value identifying a directory with a version file, as the identified "icons" directory was determined to have a version file, in this example, in the previous iteration of step 202.

Accordingly, in this second iteration, the Yes branch is taken from step 202 and the image element 304 is modified in step 204 by the web content proxy server 12, as described and illustrated earlier, resulting in image element 404 of fragment 400. In this example, the data URI that replaced the source attribute value of image element 304 is the same data URI used in the prior iteration of step 206 to replace the source attribute value of image element 302, although different data URIs can also be used.

Upon replacing the source attribute value of the image element 304, the web content proxy server 12 proceeds to step 206. In step 206, the web content proxy server 12 determines whether a script reference associated with the directory identified by the value of the data attribute included in the image element in this second iteration of step 204 has been previously inserted into the web page. In this iteration, the web content proxy server 12 will determine that script element 406 was previously inserted and has a source attribute value identifying a directory ("icons") matching the data attribute value of image element 404. Accordingly, in the second iteration in this example, the Yes branch is taken by the web content proxy server 12 from step 206 to step 202.

In step 202, the web content proxy server 12 determines whether there is another image element with a source attribute value identifying a directory with a version file, as described and illustrated earlier. In the fragment 300, the only other image element 306 does not include a source attribute value identifying a directory with a version file. Instead, the source attribute value of the image element 306 is a uniform resource locator (URL) that does not identify any directory. As there are no other image elements with a source attribute value identifying a directory with a version file, the No branch is taken to step 210.

In step 210, the web content proxy server 12 sends the web page to the requesting one of the client devices 14(1)-14(n). In other examples, the web content proxy server 12 can mark the directory, or otherwise maintain a list of directories in step 208, and include each of the script references at substantially the same time prior to sending the web page to the requesting one of the client devices 14(1)-14(n) in step 210. In these examples, the web content proxy server 12 can determine in step 206 whether the data attribute of the image element identifies a directory that has been previously marked or included in the list of directories for which a script reference is to be inserted.

In step 212, the web content proxy server 12 receives a request for a JavaScript file identified by one of the script references inserted in step 208 from the requesting one of the client devices 14(1)-14(n). The requested is sent by the one of the client devices 14(1)-14(n) upon encountering the script reference while rendering the web page.

In step 214, the web content proxy server 12 extracts a directory and file name from a path included in the request. The request can be an HTTP request including a URL path identifying the JavaScript file. In this example, the JavaScript file will be identified in the URL path of the HTTP request as "icons/v1.js" based on the source attribute value of the script reference 406 and, accordingly, the web content proxy server 12 will extract "icons" as the directory and "v1.js" as the file name from the URL path.

In step 216, the web content proxy server 12 determines whether the requested JavaScript file was previously generated. The web content proxy server 12 can determine whether the requested JavaScript file was previously generated based on whether a JavaScript file with the extracted file name is stored in the extracted directory. If the web content proxy server 12 determines that the requested JavaScript file was not previously generated, then the No branch is taken to step 218.

In step 218, the web content proxy server 12 generates a data URI map for each image in the extracted directory. Each of the data URIs can be generated by generating an encoding of each of the images, such as a base 64 encoding, for example, although other encodings can also be used. Additionally, each of the data URIs is mapped to a directory and file name corresponding to the images encoded by the data URI. Accordingly, irrespective of the number of references to each of the images in the web page, only one encoding of each of the images is generated.

In step 220, the web content proxy server 12 generates the requested JavaScript file based on the data URIs generated in step 218. The generated JavaScript file includes JavaScript code that, when executed by the one of the client devices 14(1)-14(n), is configured to replace the source attribute value of each of the image elements with one of the data URIs. The source attribute values of the image elements are replaced based on a match of the value of the data attribute of the image elements inserted in step 204 with the directory and file name mapped to one of the data URIs. Optionally, the JavaScript code is also configured to remove the data attribute from each of the image elements.

Referring to FIG. 5, an exemplary JavaScript code fragment 500 of a JavaScript file is illustrated. In this example, the fragment 500 includes a data URI 502 mapped to the "icon/fb.png" directory and file name and a data URI 504 mapped to the "icons/twitter.png" directory and file name. The fragment 500 is configured to retrieve the data attribute of all of the image elements of the web page. For each image element with a data attribute, the fragment 500 is configured to determine whether the value of the data attribute matches a directory and file name mapped to one of the data URIs. When it is determined that the data attribute value matches a directory and file name mapped to one of the data URIs, the fragment 500 is configured to replace the source attribute value of the image element with the one data URI.

In step 222, the web content proxy server 12 stores the generated JavaScript file in the directory extracted in step 214. The JavaScript file is named according to the file name extracted in step 214, which corresponds with the contents of the version file stored in the extracted directory, as described and illustrated earlier. In this example, the JavaScript file is stored in the "icons" directory with a file name of "v1.js".

In step 224, the web content proxy server 12 sends the JavaScript file to the one of the client devices 14(1)-14(n) in response to the request received in step 212. Accordingly, in this example the images are sent as a bundle based on the encodings included in the JavaScript file. Accordingly, only one request and response will be required for the one of the client devices 14(1)-14(n) to retrieve all of the images stored in a respective local directory associated with the requested web page. Subsequent to sending the JavaScript file to the requesting one of the client devices 14(1)-14(n) in step 224, the web content proxy server 12 then proceeds to step 212 to receive another request for a JavaScript file from the same or a different one of the client devices 14(1)-14(n).

Upon receipt of the JavaScript file, the requesting one of the client devices 14(1)-14(n) will execute the JavaScript file resulting in the replacement of the source attribute value for one or more of the image elements of the associated web page with a data URI, as described and illustrated earlier. Subsequent to replacing the source attribute value(s), the one of the client devices 14(1)-14(n) will render the image encoded in and defined by the data URI that replaced the source attribute value for each of the image elements. Accordingly, in this example, source attribute values of the image elements 402 and 404, previously including the data URI of the default spacer GIF image, will be replaced with the data URIs 502 and 504 of the "fb.png" and "twitter.png" images, respectively.

Referring back to step 216, if the web content proxy server 12 determines that the requested JavaScript file has been previously generated, then the Yes branch is taken to step 224 and the requested JavaScript file is sent to the requesting one of the client devices 14(1)-14(n). Whenever a change is made to the web page by a developer of the web page (e.g., addition or removal of an image), the developer can cause a new JavaScript file to be generated when requested by one of the client devices 14(1)-14(n) by changing the contents of the version file in the directory of the added or removed images (e.g., from "v1" to "v2").

By changing the contents of the version file, the reference to the JavaScript file inserted in step 208 will be to a JavaScript file with a file name not matching the file name of a previously generated JavaScript file in the directory (e.g., "v2.js"). Accordingly, the web content proxy server 12 will determine, in step 216, that the requested JavaScript file was not previously generated and will proceed to take the No branch in order to generate a new JavaScript file, which will be configured to insert the appropriate source attribute values of the image elements, as described and illustrated earlier.

Accordingly, as illustrated and described herein, this technology provides a number of advantages including providing methods, non-transitory computer readable medium, and a web content proxy server that facilitates image bundling and reduce the number of requests and responses required to retrieve web page images. Thereby, the amount of time required to render web pages is significantly reduced, particularly in high latency networks.

With this technology, data URIs including encodings of web page images are provided in a bundle through a JavaScript file that is configured to modify the web page to include the data URIs in respective image elements. Advantageously, only one encoding of each image is generated irrespective of the number of references to an image. Additionally, the encodings are stored separately from the associated web page in a JavaScript file in local directories associated with the images. Accordingly, the encodings in a directory advantageously do not have to be regenerated in response to web page changes that do not involve the images stored in the directory.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for bundling images, the method comprising:
   obtaining, by a web server, a web page requested by a client device, the web page comprising a plurality of image elements;
   determining, by the web server, when at least a first image element and a second image element of the plurality of image elements each include a HyperText Markup Language (HTML) source attribute value, wherein each of the HTML source attribute values identify an image directory and an image file name; and
   when the determination indicates that at least the first image element and the second image element of the plurality of image elements each include the HTML source attribute value:
      inserting, by the web server, and prior to sending the requested web page to the client device, a first data attribute bundle into the first image element and a second data attribute bundle into the second image element, wherein the first data attribute bundle comprises the image directory and the image file name of the HTML source attribute value associated with the first image element and the second data attribute bundle comprises the image directory and the image file name of the HTML source attribute value associated with the second image element;

replacing, by the web server, at least each of the HTML source attribute values of the first image element and the second image element of the plurality of image elements with a default data uniform resource indicator (URI) of a spacer graphic interchange format (GIF) transparent image, wherein the default data URI of the spacer GIF transparent image does not enable rendering of any of one or more images identified by the image directory and image file name associated with each of the HTML source attribute values;

inserting, by the web server, a reference to a JavaScript executable file into the requested web page, sending the requested web page to the client device, and receiving a request from the client device for the executable file; and sending, by the web server, the JavaScript executable file to the client device in response to the request, the JavaScript executable file configured when executed to replace each of the HTML source attribute values associated with the first image element and the second image element of the plurality of image elements with a data URI with a base 64 encoding of a corresponding one of the images identified by the image directory and image file name in the respective first data attribute bundle and the second data attribute bundle.

2. The method of claim 1, wherein each of the HTML source attribute value of the first image element and the second image element of the plurality of image elements identifies a different image directory and the reference to the JavaScript executable file comprises a reference to a different JavaScript executable file for the directory.

3. The method of claim 1, wherein the reference identifies the JavaScript executable file based on the image directory identified by the respective HTML source attribute value and contents of a version file in the directory, the contents including at least a portion of the image file name of the executable file.

4. The method of claim 1, wherein the reference to the JavaScript executable file is a JavaScript element or a jQuery function call, the JavaScript element comprising the respective HTML source attribute value identifying the executable file.

5. The method of claim 1, wherein the sending the executable file further comprises:

extracting at least a JavaScript executable file directory and a JavaScript executable file name from a path included in the request received from the client device for the executable file;

determining when the JavaScript executable file is stored in the JavaScript executable file directory based on the JavaScript executable file name; and generating and storing the JavaScript executable file, when the determining indicates that the JavaScript executable file is not stored in the JavaScript executable file directory, the generating the JavaScript executable file further comprising generating a data URI for each image in the JavaScript executable file directory.

6. The method of claim 5, wherein the generating the JavaScript executable file further comprises generating a data URI for a cascading style sheet (CSS) background image stored in the JavaScript executable file directory and the JavaScript executable file is further configured to, when executed by the client device, insert a style element into the web page, the style element including the data URI of the CSS background image.

7. A non-transitory computer readable medium having stored thereon instructions for bundling images comprising machine executable code which when executed by a processor, causes the processor to perform steps comprising:

obtaining a web page requested by a client device, the web page comprising a plurality of image elements;

determining when at least a first image element and a second image element of the plurality of image elements each include a HyperText Markup Language (HTML) source attribute value, wherein each of the HTML source attribute values identify an image directory and an image file name; and when the determination indicates that at least the first image element and the second image element of the plurality of image elements each include the HTML source attribute value:

inserting, and prior to sending the requested web page to the client device, a first data attribute bundle into the first image element and a second data attribute bundle into the second image element, wherein the first data attribute bundle comprises the image directory and the image file name of the HTML source attribute value associated with the first image element and the second data attribute bundle comprises the image directory and the image file name of the HTML source attribute value associated with the second image element;

replacing at least each of the HTML source attribute values of the first image element and the second image element of the plurality of image elements with a default data uniform resource indicator (URI) of a spacer graphic interchange format (GIF) transparent image, wherein the default data URI of the spacer GIF transparent image does not enable rendering of any of one or more images identified by the image directory and image file name associated with each of the HTML source attribute values;

inserting a reference to a JavaScript executable file into the requested web page, sending the requested web page to the client device, and receiving a request from the client device for the executable file; and sending the JavaScript executable file to the client device in response to the request, the JavaScript executable file configured when executed to replace each of the HTML source attribute values associated with the first image element and the second image element of the plurality of image elements with a data URI with a base 64 encoding of a corresponding one of the images identified by the image directory and image file name in the respective first data attribute bundle and the second data attribute bundle.

8. The medium of claim 7, wherein each of the HTML source attribute value of the first image element and the second image element of the plurality of image elements identifies a different image directory and the reference to the JavaScript executable file comprises a reference to a different JavaScript executable file for the directory.

9. The medium of claim 7, wherein the reference identifies the JavaScript executable file based on the image directory identified by the respective HTML source attribute value and contents of a version file in the directory, the contents including at least a portion of the image file name of the executable file.

10. The medium of claim 7, wherein the reference to the JavaScript executable file is a JavaScript element or a jQuery function call, the JavaScript element comprising the respective HTML source attribute value identifying the executable file.

11. The medium of claim 7, wherein the sending the executable file further comprises:
   extracting at least a JavaScript executable file directory and a JavaScript executable file name from a path included in the request received from the client device for the executable file;
   determining when the JavaScript executable file is stored in the JavaScript executable file directory based on the JavaScript executable file name; and
   generating and storing the JavaScript executable file, when the determining indicates that the JavaScript executable file is not stored in the JavaScript executable file directory, the generating the JavaScript executable file further comprising generating a data URI for each image in the JavaScript executable file directory.

12. The medium of claim 11, wherein the generating the JavaScript executable file further comprises generating a data URI for a cascading style sheet (CSS) background image stored in the JavaScript executable file directory and the JavaScript executable file is further configured to, when executed by the client device, insert a style element into the web page, the style element including the data URI of the CSS background image.

13. A web server apparatus, comprising: a memory comprising programmed instructions stored in the memory, wherein the memory is coupled to one or more processors which are configured to execute the programmed instructions stored in the memory to:
   obtain a web page requested by a client device, the web page comprising a plurality of image elements;
   determining when at least a first image element and a second image element of the plurality of image elements each include a HyperText Markup Language (HTML) source attribute value, wherein each of the HTML source attribute values identify an image directory and an image file name; and
   when the determination indicates that at least the first image element and the second image element of the plurality of image elements each include the HTML source attribute value:
      insert, and prior to sending the requested web page to the client device, a first data attribute bundle into the first image element and a second data attribute bundle into the second image element, wherein the first data attribute bundle comprises the image directory and the image file name of the HTML source attribute value associated with the first image element and the second data attribute bundle comprises the image directory and the image file name of the HTML source attribute value associated with the second image element;
      replace at least each of the HTML source attribute values of the first image element and the second image element of the plurality of image elements with a default data uniform resource indicator (URI) of a spacer graphic interchange format (GIF) transparent image, wherein the default data URI of the spacer GIF transparent image does not enable rendering of any of one or more images identified by the image directory and image file name associated with each of the HTML source attribute values;
      insert a reference to a JavaScript executable file into the requested web page, sending the requested web page to the client device, and receiving a request from the client device for the executable file; and
      send the JavaScript executable file to the client device in response to the request, the JavaScript executable file configured when executed to replace each of the HTML source attribute values associated with the first image element and the second image element of the plurality of image elements with a data URI with a base 64 encoding of a corresponding one of the images identified by the image directory and image file name in the respective first data attribute bundle and the second data attribute bundle.

14. The apparatus of claim 13, wherein each of the HTML source attribute value of the first image element and the second image element of the plurality of image elements identifies a different image directory and the reference to the JavaScript executable file comprises a reference to a different JavaScript executable file for the directory.

15. The apparatus of claim 13, wherein the reference identifies the JavaScript executable file based on the image directory identified by the respective HTML source attribute value and contents of a version file in the directory, the contents including at least a portion of the image file name of the executable file.

16. The apparatus of claim 13, wherein the reference to the JavaScript executable file is a JavaScript element or a jQuery function call, the JavaScript element comprising the respective HTML source attribute value identifying the executable file.

17. The apparatus of claim 13, wherein the processor is further configured to be capable of executing the programmed instructions stored in the memory to:
   extract at least a JavaScript executable file directory and a JavaScript executable file name from a path included in the request received from the client device for the executable file;
   determine when the JavaScript executable file is stored in the JavaScript executable file directory based on the JavaScript executable file name; and
   generate and storing the JavaScript executable file, when the determining indicates that the JavaScript executable file is not stored in the JavaScript executable file directory, the generating the JavaScript executable file further comprising generating a data URI for each image in the JavaScript executable file directory.

18. The apparatus of claim 17, wherein the processor is further configured to be capable of executing the programmed instructions stored in the memory to generate a data URI for a cascading style sheet (CSS) background image stored in the JavaScript executable file directory and the JavaScript executable file is further configured to, when executed by the client device, insert a style element into the web page, the style element including the data URI of the CSS background image.

* * * * *